April 14, 1964   J. G. KAY ETAL   3,128,876
RECIPROCATING PUSHER-TYPE CONVEYOR
Filed Jan. 26, 1962   2 Sheets-Sheet 2
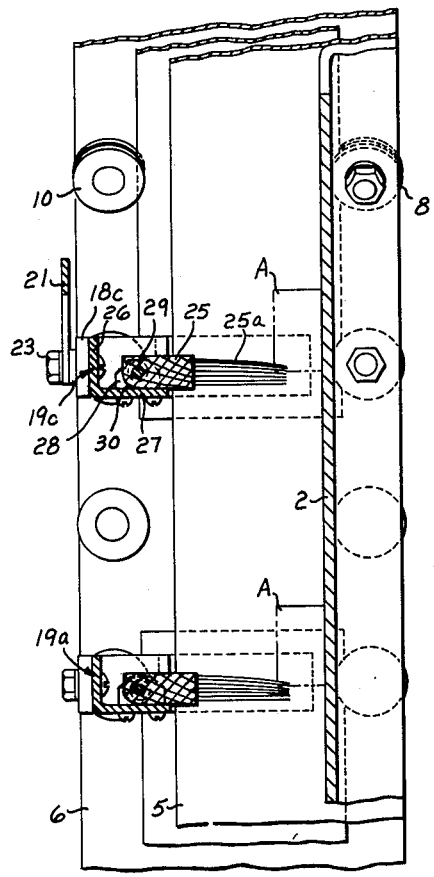
FIG. 5.
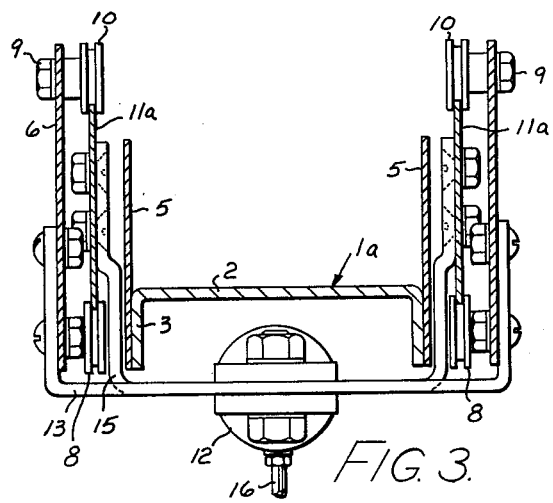
FIG. 3.
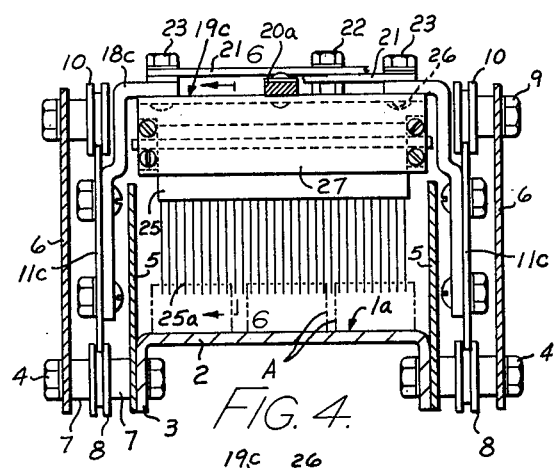
FIG. 4.
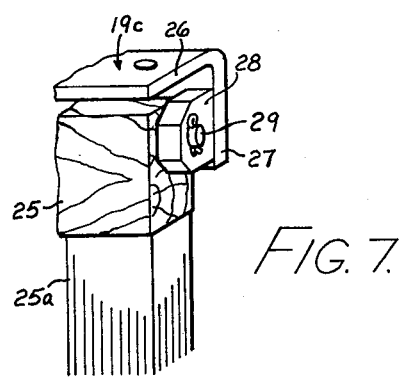
FIG. 7.
FIG. 6.
INVENTOR.
JOHN G. KAY
ALFRED L. OSINSKI
BY
*Gerald J. Baldwin*
ATTORNEY United States Patent Office 3,128,876
Patented Apr. 14, 1964

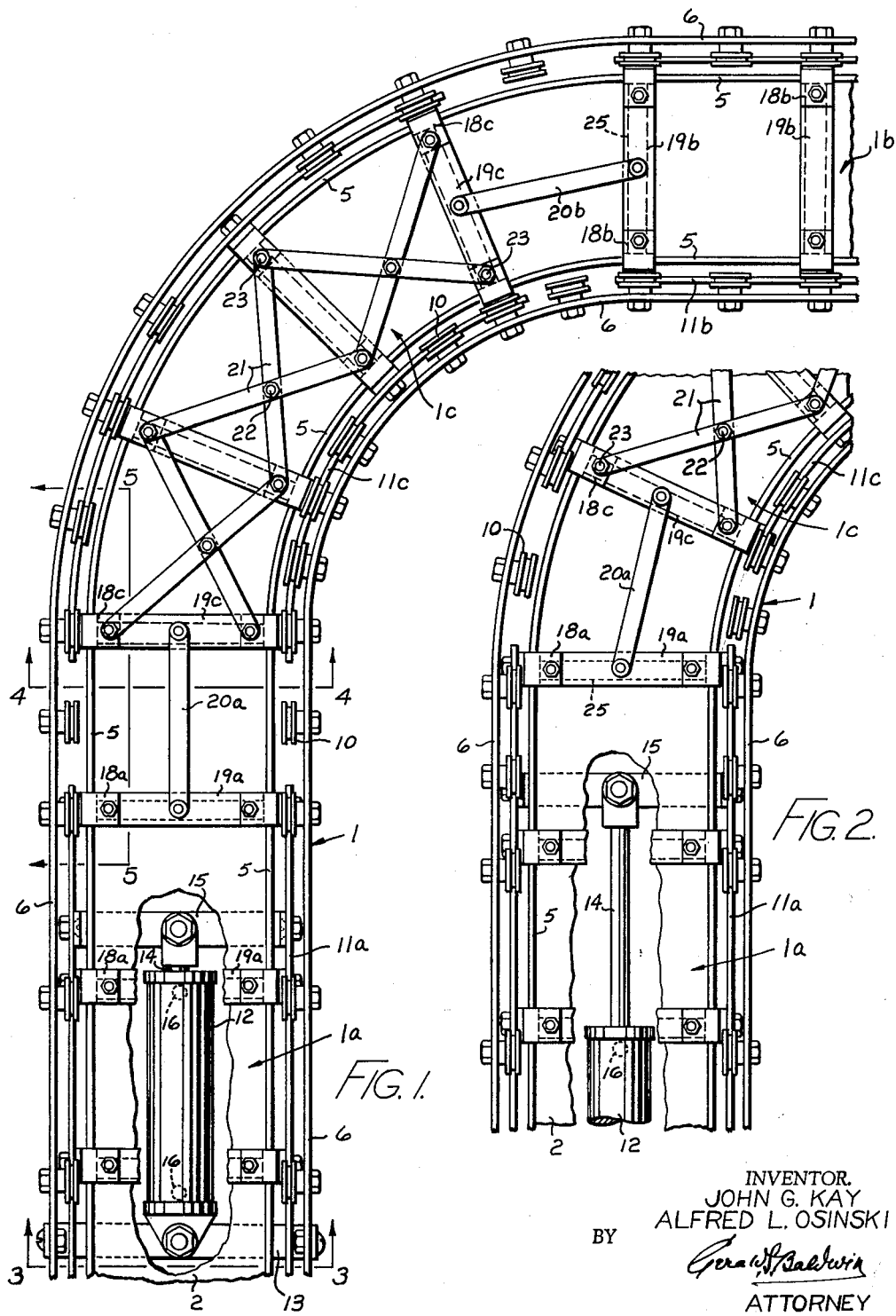

3,128,876
RECIPROCATING PUSHER-TYPE CONVEYOR
John G. Kay, Detroit, and Alfred L. Osinski, Warren, Mich., assignors to F. Jos. Lamb Company, Detroit, Mich., a corporation of Michigan
Filed Jan. 26, 1962, Ser. No. 168,912
15 Claims. (Cl. 198—221)

This invention relates to improvements in conveyors, and refers particularly to a conveyor wherein a plurality of longitudinally spaced feed members are mounted for reciprocation over a runway to advance workpieces step by step therealong.

It is an object of the invention to provide such a conveyor wherein a portion of the runway is curved and each feed member mounted for reciprocation thereon is so supported that it remains radial to the axis of the said curved portion throughout its movements. For it is found that if quite wide workpieces are advanced along a correspondingly wide curved portion of a runway they are liable to jam and not travel freely therealong unless the feed members are maintained radial to the axis thereof throughout their movement.

Another object of the invention is to provide such a conveyor wherein the runway is partly straight and partly curved, and adjacent feed members, one normally over the straight portion and the other normally over the curved portion, are so connected that the reciprocation of the feed members over one portion of the runway imparts reciprocation to those over the other.

Moreover since each feed member must at the conclusion of its rearward stroke be somewhat behind the workpiece which was advanced during the last forward stroke of the feed member behind it, and since the length of the strokes of the feed members must of course be somewhat greater than the spacing between them, it is apparent that the leading feed member over one portion of the runway must advance each workpiece in turn sufficiently past the junction of the two portions for the trailing feed member on the other portion to pass behind and engage it for further advancement during the next forward stroke. It is therefore an object of the invention to provide such a conveyor wherein provision is made for adjacent feed members normally extending over adjacent extremities of the straight and curved portions to also pass over adjacent extremities of the curved and straight portions, respectively.

Another object of the invention is to provide such a conveyor which is relatively cheap to manufacture and easy to install.

With these and other objects and advantages in view, the invention is hereinafter more fully described with the aid of the accompanying drawings, in which:

FIGURE 1 is a plan view of the invention showing two straight portions of a conveyor connected by a curved portion, wherein the feed members are in their retracted positions.

FIGURE 2 is a similar view showing a straight and a curved portion of the conveyor with the feed members in their advanced positions.

FIGURES 3, 4 and 5 are enlarged sections on the lines 3—3, 4—4 and 5—5, respectively.

FIGURE 6 is a section on the line 6—6 of FIGURE 4, and

FIGURE 7 is an enlarged perspective view showing a part of one support and the feed member mounted thereon.

Referring to the drawings, 1 designates a continuous runway along which workpieces A are adapted to be advanced, and consists in the present instance of straight portions 1a and 1b connected to one another by a central curved portion 1c. The runway throughout its entire length includes a continuous pan 2 having downturned lateral margins 3 to which longitudinal guide rails 5 are secured by bolts 4. The guide rails project upwardly and form the sides of the runway. Uniformly outwardly spaced from the guide rails 5 throughout their length are supporting rails 6. The bolts 4 also project outwardly through the supporting rails, and mounted on each bolt between the rails 5 and 6 are spacers 7 between which a lower flanged roller 8 is mounted for rotation. Projecting through the supporting rails 6 adjacent their upper extremities are bolts 9 having upper flanged rollers 10 rotatably mounted thereon which are inwardly spaced from the supporting rails the same distance as the lower rollers 8. The bolts 4 and 9 on the straight portions 1a and 1b of the runway are disposed at right angles to the length of the pan 2, and those on the curved portion of the runway extend radially to the axis thereof.

Supported for longitudinal reciprocation by and between the rollers 8 and 10 on the portions 1a, 1b and 1c of the runway are opposed transfer rails 11a, 11b and 11c respectively. It will be noted that along the curved portion 1c of the runway and particularly adjacent the ends thereof the rollers 8 and 10 are arranged closer to one another to afford greater support for the curved transfer rails 11c. The rails 5, 6, 11a, 11b and 11c are all resilient and are usually made of spring steel. Suitable driving means are provided on the conveyor for imparting reciprocation to one opposed pair of the transfer rails 11a or 11b. The driving means shown includes a cylinder 12 suitably supported on the runway portion 1a by means of a bracket 13 fastened at its extremities to the supporting rail 6. Projecting from one extremity of the cylinder is a piston rod 14 extending from a piston in the cylinder. The outer extremity of the piston rod is secured to a yoke 15 the extremities of which are attached to the opposed transfer rail 11a. The cylinder is provided with connections 16 adjacent its opposite extremities for attachment to a well known type of valve (not shown) through which fluid under pressure is delivered alternately to each end of the cylinder while the opposite end of the latter is open to the atmosphere.

Extending upwardly and inwardly from each opposed pair of transfer rails 11a, 11b and 11c are a plurality of longitudinally spaced pairs of straps 18a, 18b and 18c, respectively, and dependingly mounted on each opposed pair of straps 18a, 18b and 18c is a support 19a, 19b and 19c, respectively. One extremity of a thrust rod 20a is pivotally mounted on the support 19a next to the curved portion 1c of the runway and its opposite extremity is pivotally mounted on the nearest support 19c thereto. Moreover the rod 20a is secured to each of the last named supports centrally of their length.

Connecting each adjacent pair of supports 19c are a pair of diagonal braces 21 which cross each other intermediately of their length where they are secured to one another by a locking bolt 22. Other bolts 23 are employed for securing the extremities of the braces 21 to the supports 19c, and on intermediate holders 19c each bolt 23 extends through two of the braces. The relative lengths of the two braces of each crossed pair are such that the inner and outer transfer rails 11c are moved together around a common axis which is the axis of the curved portion of the runway. Consequently the supports 19c are reciprocated about different portions of a common arcuate path, and are maintained uniformly spaced from one another throughout their movement. Pivotally secured to the support 19c nearest to the straight portion 1b of the runway is one extremity of a thrust rod 20b the opposite extremity of which is pivotally connected to the support 19b nearest thereto. The extremities of the thrust rod 20b are secured to the last named supports centrally of their length.

From the foregoing it will be seen that the opposed transfer rails 11a actuate the supports 19a. The support 19a nearest to the curved portion 1c of the runway reciprocates the support 19c adjacent thereto through the thrust rod 20a. The remaining supports 19c are reciprocated through the crossed braces 21 while the transfer rails 11c function as slides. The thrust rod 20b connects the adjacent supports 19c and 19b and through the latter reciprocation is imparted to the transfer rails 11b by which the rest of the supports 19b are actuated.

As all the supports 19a, 19b and 19c are identical and each has an identical feed member 25 thereon, we will now describe one support 19c (FIGURES 6 and 7) and its feed member 25 which in the instance shown consists of a brush having resilient bristles 25a projecting therefrom. The support 19c is of angle section and includes a horizontal flange 26 dependingly supported between the straps 18c, and a vertical flange 27. Secured to the inner face of the latter at opposite extremities are brackets 28 which support opposite ends of a rod 29, and pivotally mounted on the rod is a feed member 25 which normally hangs downwardly.

When in its normal position the feed member is prevented from turning in a clockwise direction (FIGURE 6) by the flange 27 but is permitted limited pivotal movement in the opposite direction due to the provision of a radius 30 coaxial with the rod 29 formed along the upper margin of the feed member adjacent the flange 27. When resting against the flange 27 the feed member is held thereby against movement in a clockwise direction (FIGURE 6) so that it remains substantially vertical to sweep a workpiece to the right along the runway. When the support 19c is moved to the left (FIGURE 6) its feed member is adapted to be moved in an anti-clockwise direction as indicated at 25' by a workpiece on the runway and passes over it. Thus the workpieces are advanced step by step by the feed members along the runway as the supports are reciprocated.

Since the distance which the supports are reciprocated must obviously be greater than the spacing between adjacent supports, the trailing support 19c must on its rearward stroke reach a point behind that occupied by the leading support 19a at the end of its forward stroke; and the leading support 19c must travel forward to a point in front of the rearward position reached by the trailing support 19b. Such movement occurs due to the fact that the transfer rails are resilient; the longitudinal spacing of the rollers 8 and 10 is reduced at critical points along the runway; and the annular grooves in the rollers are wide enough to freely receive and guide the extremities of the transfer rails as they travel past the junctions of the curved and the straight portions of the runway. Moreover all the rollers 8 and 10 on each side of the runway are in longitudinal alignment, and around the curved portion of the runway the outer transfer rails travel faster than the inner transfer rails.

Again while the power source has been described as being connected to the transfer rails 11a it is obvious that, if desired, it may be connected directly to one of the supports on the curved portion of the runway.

While in the foregoing one of the embodiments of the invention has been described and shown, it is understood that alterations and modifications may be made thereto provided the said alterations and modifications fall within the scope of the appended claims.

What we claim is:

1. A conveyor comprising a longitudinally curved runway, transfer rails on opposite sides of the curved runway, means mounted on the opposite sides of the runway for supporting the transfer rails for reciprocation coaxially with the runway, a plurality of supports spaced longitudinally of the curved runway, said supports extending radially of the curved runway and secured to the transfer rails, means for reciprocating one of the supports longitudinally, means interconnecting said supports in fixed relation to each other and in fixed radial relation to the axis of the curved runway, and feed members mounted on the supports for advancing workpieces along the curved runway upon each forward movement of said supports.

2. The combination in claim 1, wherein the means connecting each adjacent pair of supports includes a pair of crossed braces, and a locking bolt retaining each pair at a predetermined inclination to one another.

3. The combination in claim 1, wherein the feed members are pivotally mounted on the supports, and stops on said supports for preventing pivotal movement of said feed members in one direction from their operative positions.

4. The combination in claim 1, wherein the means on the sides of the runway for supporting the transfer rails for reciprocation includes flanged rollers having their axes coaxial with the curved runway.

5. A conveyor comprising a continuous runway including a straight portion and a curved portion, opposed transfer rails mounted on opposite sides of the straight portion for reciprocation parallel therewith, means for reciprocating the transfer rails, other transfer rails mounted on opposite sides of the curved portion of the runway for reciprocation coaxially therewith, supports secured to and extending between each opposed pair of transfer rails, said supports being longitudinally spaced from one another, a thrust rod connecting the leading support on the first named transfer rails with the trailing support on said other transfer rails, means connecting each adjacent pair of supports on the other transfer rails whereby they remain radial to the axis of the curved portion of the runway throughout their movement, and feed members mounted on all the supports for advancing workpieces along the runway upon forward movement of the first named transfer rails.

6. The combination in claim 5, wherein the extremities of the thrust rod are pivotally secured to the supports to which they are connected centrally of their length.

7. A conveyor comprising a continuous runway including a straight portion and a curved portion, opposed transfer rails mounted on opposite sides of the straight portion for reciprocation parallel therewith, other opposed transfer rails mounted for reciprocation on opposite sides of the curved portion for movement coaxially therewith, supports secured to and extending between each opposed pair of transfer rails, said supports being longitudinally spaced from one another, means for reciprocating one of the supports on the curved portion of the runway, a thrust rod connecting the leading support on the other transfer rails with the trailing support on the first named transfer rails, means connecting each adjacent pair of supports secured to said other transfer rails whereby they remain radial to the axis of the curved portion of the runway throughout their movement, and feed members mounted on all the supports for advancing workpieces along the runway upon forward movement of the supports.

8. The combination in claim 7, wherein the means connecting each adjacent pair of supports secured to the other runway includes a pair of crossed braces, and a locking bolt retaining each pair at a predetermined inclination to one another, whereby the transfer rails on the outer side of the runway travel faster than the transfer rails on the inner side.

9. A conveyor comprising a continuous runway including a straight portion and a curved portion, opposed resilient transfer rails, rollers mounted along opposite sides of the straight portion of the runway for supporting the transfer rails for reciprocation parallel therewith, means for reciprocating the transfer rails, other opposed resilient transfer rails, other rollers mounted along opposite sides of the curved portion of the runway for supporting the other transfer rails for reciprocation coaxially with the curved portion of the runway, all the rollers on each side of the runway being in alignment, supports secured to and extending between each opposed pair of transfer rails, a thrust rod pivotally connected at one extremity to the leading support on the first named transfer rails and pivotally connected at its other extremity to the trailing support on said other transfer rails, means connecting each adjacent pair of supports secured to said other transfer rails whereby they remain radial to the axis of the curved portion of the runway throughout their movement, and feed members depending from all the supports for advancing workpieces along the runway upon forward movement of the first named transfer rails.

10. A conveyor comprising a continuous runway including a straight portion and a curved portion, opposed resilient transfer rails, rollers mounted along opposite sides of the straight portion of the runway for supporting the transfer rails for reciprocation parallel therewith, other opposed resilient transfer rails, other rollers mounted along opposite sides of the curved portion of the runway for supporting the other transfer rails for reciprocation coaxially therewith, all the rollers on each side of the runway being in alignment, supports secured to and extending between opposed pairs of the transfer rails, driving means for reciprocating one of the supports secured to said other transfer rails, a thrust rod pivotally connected at one extremity to the leading support on said other transfer rails and pivotally connected at its other extremity to the trailing support on said first named transfer rails, means connecting each adjacent pair of supports secured to said other transfer rails whereby they remain radial to the axis of the curved portion of the runway throughout their movement, and feed members depending from all the supports for advancing workpieces along the runway upon forward movement of the driven support on said other transfer rails.

11. A conveyor comprising a runway including a curved portion and a contiguous straight portion which extends in a direction generally tangential to the curved portion, means forming a straight guide extending along and parallel to the straight portion of the runway, means forming a curved guide extending along the curved portion of the runway and concentric therewith, a straight transfer rail mounted for reciprocation on said straight guide means, a second transfer rail mounted for reciprocation on said curved guide means, said second transfer rail being concentric with the curved portion of the runway, linkage means forming a driving connection between said transfer rails, each transfer rail having feed members mounted thereon for advancing work pieces along said runway when the transfer rails are reciprocated and means for reciprocating one of said transfer rails through a stroke such that the curved transfer rail traverses only the curved guide means and the straight transfer rail traverses only the straight guide means.

12. The combination set forth in claim 11 wherein the adjacent ends of said transfer rails are spaced apart such that upon reciprocation of said rails, the leading end of the straight transfer rail and the trailing end of the curved transfer rail alternately travel up to and away from the point of tangency between the straight and curved portions of the runway.

13. The combination set forth in claim 12 wherein said guide means includes a plurality of guide rollers in which the two transfer rails are engaged.

14. The combination set forth in claim 13 wherein at least one of said guide rollers are located at said point of tangency and the stroke of said reciprocating means is such that the leading end of the straight transfer rail and the trailing end of the curved transfer rail are alternately engaged by said one guide roller.

15. The combination set forth in claim 14 wherein said linkage means comprises a thrust rod pivotally connected between said transfer rails.

No references cited.